US011084221B2

(12) United States Patent
Deak

(10) Patent No.: US 11,084,221 B2
(45) Date of Patent: Aug. 10, 2021

(54) METHOD AND APPARATUS FOR A RE-COATER BLADE ALIGNMENT

(71) Applicant: GENERAL ELECTRIC COMPANY, Schenectady, NY (US)

(72) Inventor: Stephen Michael Deak, Liberty Township, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 547 days.

(21) Appl. No.: 15/963,185

(22) Filed: Apr. 26, 2018

(65) Prior Publication Data

US 2019/0329497 A1 Oct. 31, 2019

(51) Int. Cl.
*B29C 64/393* (2017.01)
*G01B 11/27* (2006.01)
*B29C 64/214* (2017.01)
*B33Y 50/02* (2015.01)
*B33Y 30/00* (2015.01)
*G01B 11/14* (2006.01)

(52) U.S. Cl.
CPC .......... *B29C 64/393* (2017.08); *B29C 64/214* (2017.08); *B33Y 30/00* (2014.12); *B33Y 50/02* (2014.12); *G01B 11/14* (2013.01); *G01B 11/272* (2013.01)

(58) Field of Classification Search
CPC .................................................... B29C 64/393
See application file for complete search history.

(56) References Cited

U.S. PATENT DOCUMENTS

| 5,059,021 | A | 10/1991 | Spence et al. |
| 5,123,734 | A | 6/1992 | Spence et al. |
| 5,174,931 | A | 12/1992 | Almquist et al. |
| 5,943,235 | A | 8/1999 | Earl et al. |
| 6,492,651 | B2 | 12/2002 | Kerekes |
| 6,607,689 | B1 | 8/2003 | Farnworth |
| 7,520,740 | B2 | 4/2009 | Wahlstrom et al. |
| 7,585,450 | B2 | 9/2009 | Wahlstrom et al. |
| 7,690,909 | B2 | 4/2010 | Wahlstrom |
| 8,083,513 | B2 | 12/2011 | Montero-Escuder et al. |
| 8,105,527 | B2 | 1/2012 | Wahlstrom |
| 8,366,432 | B2 | 2/2013 | Perret et al. |
| 9,034,236 | B2 | 5/2015 | Xu et al. |
| 9,114,478 | B2 | 8/2015 | Scott et al. |
| 2015/0298259 | A1 | 10/2015 | Colin et al. |
| 2017/0143145 | A1 | 5/2017 | Peynet |

FOREIGN PATENT DOCUMENTS

| EP | 3205483 A1 | 8/2017 |
| WO | 2015103476 A1 | 7/2015 |
| WO | 2016176432 A1 | 11/2016 |

*Primary Examiner* — Larry W Thrower
(74) *Attorney, Agent, or Firm* — Dority & Manning, P.A.

(57) ABSTRACT

A method and an optical measurement apparatus for a re-coater blade alignment are disclosed. The method includes adjusting an optical measurement apparatus over a surface of a material to align the optical measurement apparatus with a reference plane of the material. Further, the method includes positioning a re-coater assembly, the optical measurement apparatus, and the material such that the re-coater assembly is between the optical measurement apparatus and the material, and so a re-coater blade of the re-coater assembly is positioned proximate to the material. The method further includes adjusting the re-coater assembly via a plurality of second aligning elements to align the re-coater blade in parallel with the optical measurement apparatus.

8 Claims, 7 Drawing Sheets

METHOD AND APPARATUS FOR A RE-COATER BLADE ALIGNMENT

BACKGROUND

Embodiments of the present specification relate to a method and an apparatus for alignment of a re-coater blade with a surface of a material used for building a component.

Rapid prototyping and manufacturing (RP&M) machines are used to build three-dimensional components, layer-by-layer from a material, by using data representing successive cross-sections of the component to be built. Types of RP&M machines include a stereolithography machine, a laser sintering machine, and ink jet solid image printing machine. In the stereolithography machine, a container is configured to hold the material used for building the component, and a support platform is configured to support the build component, raise, and lower within the container. Similarly, a re-coater assembly is configured to spread the material in the container or remove the material from the container. A light emitting device is configured to emit light beams to cure the material, thereby building the component from the material.

In such machines, it may be important to maintain a correct blade gap between a re-coater blade and the material, thus possibly reducing defects in each layer of the component. The blade gap may be maintained by aligning the re-coater blade with a surface of the material. Currently, the blade gap setting is performed using a plurality of shims of known thickness. Typically, at least some of plurality of shims are used repeatedly between the re-coater blade and a plurality of alignment-check blocks disposed on the support platform to measure blade gap, and accordingly the re-coater blade is aligned after each such measurements. Such a process and apparatus used for the re-coater blade alignment typically relies on tactile skills of person, thus they may be prone to inaccurate alignment resulting in building defective component. Also, the conventional process and apparatus may increase down-time of the machine. Further, the re-coater blade alignment is a parameter shown to cause machine-to-machine variations. Thus, the conventional process and apparatus may undesirably have a large gauge repeatability and reproducibility (R&R.) Accordingly, there is a need for an improved method and apparatus for a re-coater blade alignment.

SUMMARY

In accordance with one embodiment of the present specification, a method for a re-coater blade alignment is disclosed. The method includes adjusting an optical measurement apparatus over a surface of a material to align the optical measurement apparatus with a reference plane of the material. Further, the method includes positioning a re-coater assembly, the optical measurement apparatus, and the material such that the re-coater assembly is between the optical measurement apparatus and the material, and so a re-coater blade of the re-coater assembly is positioned proximate to the material. The method further includes adjusting the re-coater assembly to align the re-coater blade in parallel with the optical measurement apparatus.

In accordance with another embodiment of the present specification, a method for a re-coater blade aligned is disclosed. The method includes transmitting a plurality of first energy from a plurality of energy devices to a surface of a material, where the plurality of energy devices is positioned at a plurality of first locations along a length of an optical measurement apparatus. Further, the method includes receiving a plurality of reflected first energy from the surface of the material. The method further includes measuring a plurality of first radial distances between the surface of the material and the optical measurement apparatus based on the plurality of reflected first energy to determine a first reference plane of the optical measurement apparatus. Further, the method includes calibrating the optical measurement apparatus until a plurality of measured first radial distances are equal, thereby aligning the first reference plane with a reference plane of the material. The method further includes positioning a re-coater assembly, the optical measurement apparatus, and the material such that the re-coater assembly is between the optical measurement apparatus and the material, and so a re-coater blade of the re-coater assembly is positioned proximate to the material. Further, the method includes transmitting a plurality of second energy from the plurality of energy devices to a plurality of target elements of the re-coater assembly, where the plurality of target elements is positioned at a plurality of second locations along a length of the re-coater assembly. The method further includes receiving a plurality of reflected second energy from the plurality of target elements. Further, the method includes measuring a plurality of second radial distances between the re-coater assembly and the optical measurement apparatus based on the plurality of reflected second energy to determine a second reference plane of the re-coater assembly. The method further includes calibrating the re-coater assembly until a plurality of measured second radial distances are equal, thereby aligning the second reference plane with the first reference plane.

In accordance with yet another aspect of the present specification, a rapid prototyping and manufacturing machine for building a component is disclosed. The rapid prototyping and manufacturing machine includes an optical measurement apparatus and a re-coater assembly. The optical measurement apparatus is detectably coupled to the rapid prototyping and manufacturing machine. The optical measurement apparatus includes a measurement arm, a plurality of first aligning elements, and a plurality of energy devices. The plurality of first aligning elements is coupled to the measurement arm. The plurality of energy devices is coupled to the measurement arm and positioned at a plurality of first locations along a length of the optical measurement apparatus. The re-coater assembly is movably coupled to the rapid prototyping and manufacturing machine, and positioned between the optical measurement apparatus and a material. The re-coater assembly includes a re-coater arm, a plurality of second aligning elements, the re-coater blade, and a plurality of target elements. The plurality of second aligning elements is coupled to the re-coater arm. The re-coater blade is coupled to the re-coater arm and positioned proximate to the material. The plurality of target elements is coupled to the re-coater blade and positioned at a plurality of second locations along a length of the re-coater blade, where at least some of the plurality of second aligning elements is configured to align the re-coater assembly in parallel with the optical measurement apparatus.

BRIEF DESCRIPTION OF THE DRAWINGS

These and other features and aspects of embodiments of the present specification will become better understood when the following detailed description is read with reference to the accompanying drawings in which like characters represent like parts throughout the drawings, wherein.

DETAILED DESCRIPTION

Figure 1:
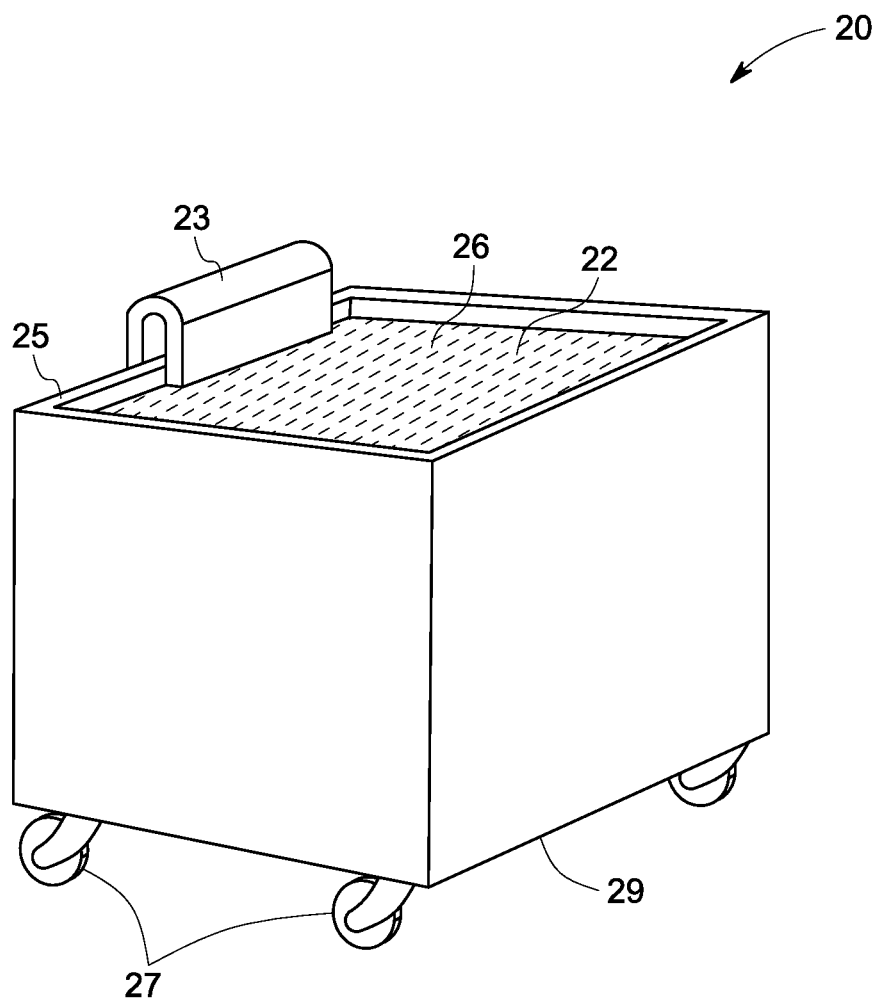
FIG. 1 is a perspective view of a container filled with a material, in accordance with embodiments of the present specification.

Embodiments discussed herein disclose a method and an optical measurement apparatus (hereinafter also referred to as "apparatus") for a re-coater blade alignment. In one or more embodiments, the optical measurement apparatus is aligned to a surface of a material, which defines a reference plane of the material. The re-coater blade is later aligned in parallel with the optical measurement apparatus, thereby indirectly aligning the re-coater blade to the reference plane of the material. In some embodiments, the material may include one of a resin, a paste, or a powder.

Further, embodiments discussed herein disclose a rapid prototyping and manufacturing (RP&M) machine used to build a component from a material. In one or more embodiments, the RP&M machine may include one of a stereolithography machine, a laser sintering machine, or a powder bed binder-jet. In one example embodiment, the RP&M machine includes an optical measurement apparatus and a re-coater assembly. In such example embodiments, the optical measurement apparatus is detectably coupled to the RP&M machine and positioned above a container filled with the material, and the re-coater assembly is movably coupled to the RP&M machine and positioned between the optical measurement apparatus and the container. In certain embodiments, the material is pre-filled in the container and a surface of the material defines the reference plane of the material. The optical measurement apparatus is adjusted over the surface of the material for aligning with the reference plane of the material. In some embodiments, the optical measurement apparatus is detachably coupled to a pre-defined template of the RP&M machine to align the optical measurement apparatus with the reference plane of the material. In some other embodiments, the optical measurement apparatus includes a plurality of first aligning elements, where at least some of the plurality of first aligning elements is adjusted to align the optical measurement apparatus with the reference plane of the material. In one example embodiment, the re-coater assembly, the optical measurement apparatus, and the material are positioned such that the re-coater assembly is between the optical measurement apparatus and the material, and so a re-coater blade of the re-coater assembly is proximate to the material.

In some embodiments, the re-coater assembly is adjusted via a plurality of second aligning elements to align the re-coater blade in parallel with the optical measurement apparatus. Thus, in one or more embodiments, the re-coater blade is indirectly aligned to the reference plane of the material via the alignment of the re-coater blade with the optical measurement apparatus. In such example embodiments, upon indirect alignment of the re-coater blade with the surface of the material, the optical measurement apparatus may be detached from the machine and used for alignment of another re-coater blade of another re-coater assembly used in a different machine.

In accordance with one or more exemplary embodiments, the optical measurement apparatus includes a plurality of energy devices, for example, laser devices configured to align a measurement arm of the optical measurement apparatus with the surface of the material or the reference plane of the material. In some embodiments, at least one of the plurality of laser devices may be a transceiver. The plurality of energy devices is used for alignment of the re-coater blade with the measurement arm. Thus, the plurality of energy devices used for alignment of the re-coater blade with the measurement arm, may avoid usage of conventional shims for the alignment of the re-coater blade, thereby reducing a lead time for the alignment of the re-coater blade with the reference plane. Further, the optical measurement apparatus may be reused to align another re-coater blade in another machine, without relying on the skill of operators for such alignments of the re-coater blade, thereby possibly reducing a large gauge repeatability and reproducibility (R&R.)

FIG. 1 illustrates a perspective view of a container 20 in accordance with one embodiment of the present specification. The container 20, for example, a vat is at least partially pre-filled with a material 22. In one embodiment, the material 22 is a resin. In some other embodiments, the material 22 may a paste, a powder, and the like. The material 22 filled in the container 20 defines a surface 26 (i.e., upper surface) for a reference plane of the material 22. In the illustrated embodiment, the container 20 further includes a bracket 23 disposed along a peripheral side 25 of the container 20, and a plurality of rollers 27 disposed at a bottom surface 29 of the container 20. In one embodiment, the bracket 23 is a u-shaped component disposed on the peripheral side 25 of the container 20. The bracket 23 may be configured to move a support platform (not shown in FIG. 1) radially during a process of building a component (not shown in FIG. 1.) The plurality of rollers 27 may be configured to move (e.g., roll) the container 20 in and out of a rapid prototyping and manufacturing (RP&M) machine (not shown in FIG. 1) for building the component. In a non-limiting embodiment of the present invention, the container 20, may alternatively include a plurality of sliding elements to move (e.g., slide) the container 20 in and out of the RP&M machine.

Figure 2:
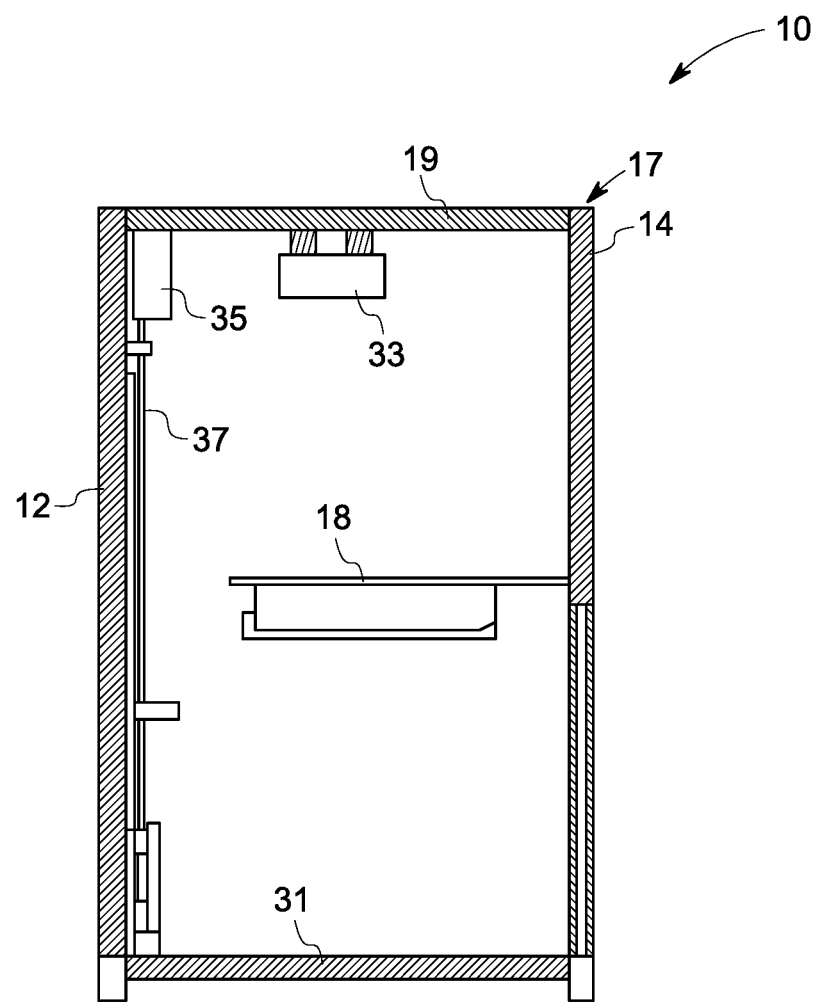
FIG. 2 is a side view of a rapid prototyping and manufacturing machine, in accordance with embodiments of the present specification.
Figure 4:
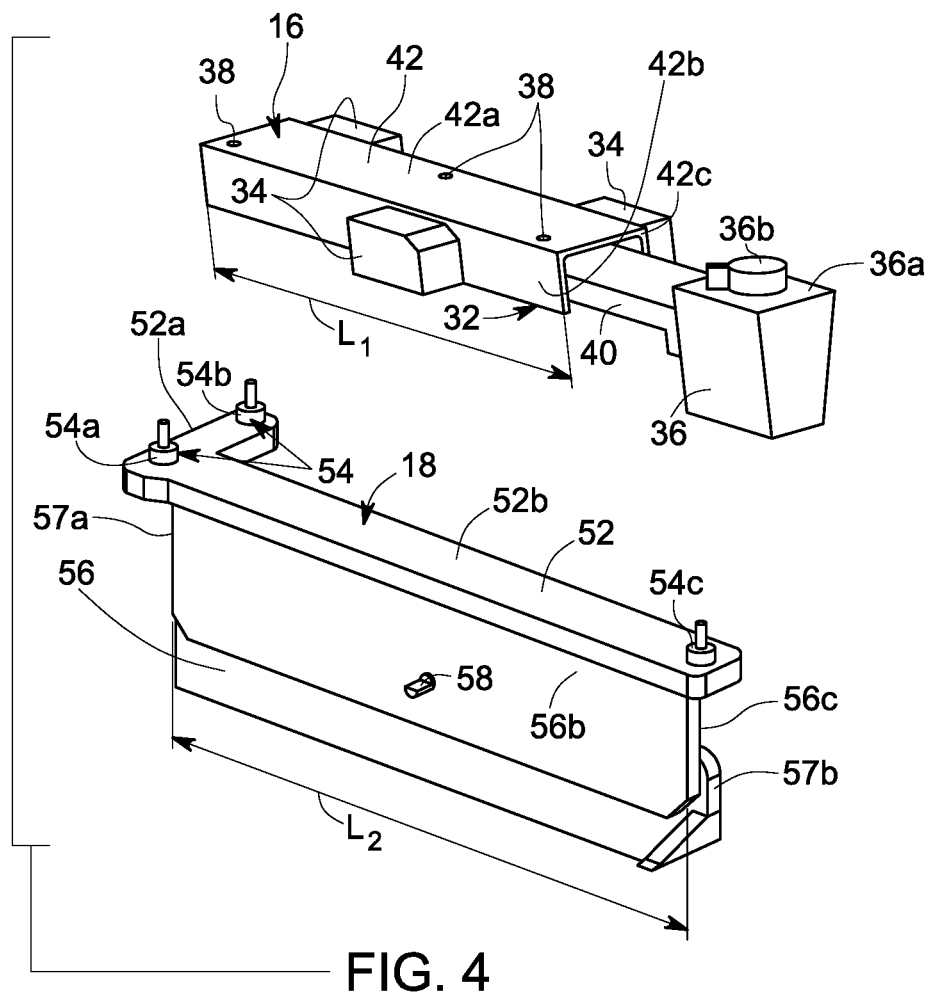
FIG. 4 is a perspective view of an optical measurement apparatus and a re-coater assembly, in accordance with embodiments of the present specification.

FIG. 2 illustrates a side view of a rapid prototyping and manufacturing (RP&M) machine 10 in accordance with one embodiment of the present specification. In one embodiment, the RP&M machine 10 may be used for building a component (not shown in FIG. 2) from a material 22 (as shown in FIG. 1.) In one embodiment, the RP&M machine 10 is a stereolithography machine. In another embodiment, the RP&M machine 10 is a laser sintering machine, a powder bed binder-jet, or the like. In the illustrated embodiment of FIG. 2, the RP&M machine 10 includes a housing 17 including a first side wall 12, a second side wall 14, a roof 19, a floor 31, an optical measurement apparatus 16 (as shown in FIG. 4), a re-coater assembly 18, and a motor 35. The first and second side walls 12, 14 are mutually opposite sides of the RP&M machine 10. The housing 17 may further include a door (not shown) for allowing the container 20 to move in and out of the machine 10. A light emitting device 33 is coupled to a mid-section of the roof 19, the motor 35 is coupled to the side-section of the roof 19, and the re-coater assembly 18 is movably coupled to the second side wall 14. In one embodiment, the re-coater assembly 18 is configured to move longitudinally and/or laterally during the process of building the component. The motor 35 is configured to actuate the bracket 23 (as shown in FIG. 1) to move radially via an elevator rod 37.

Figure 3:
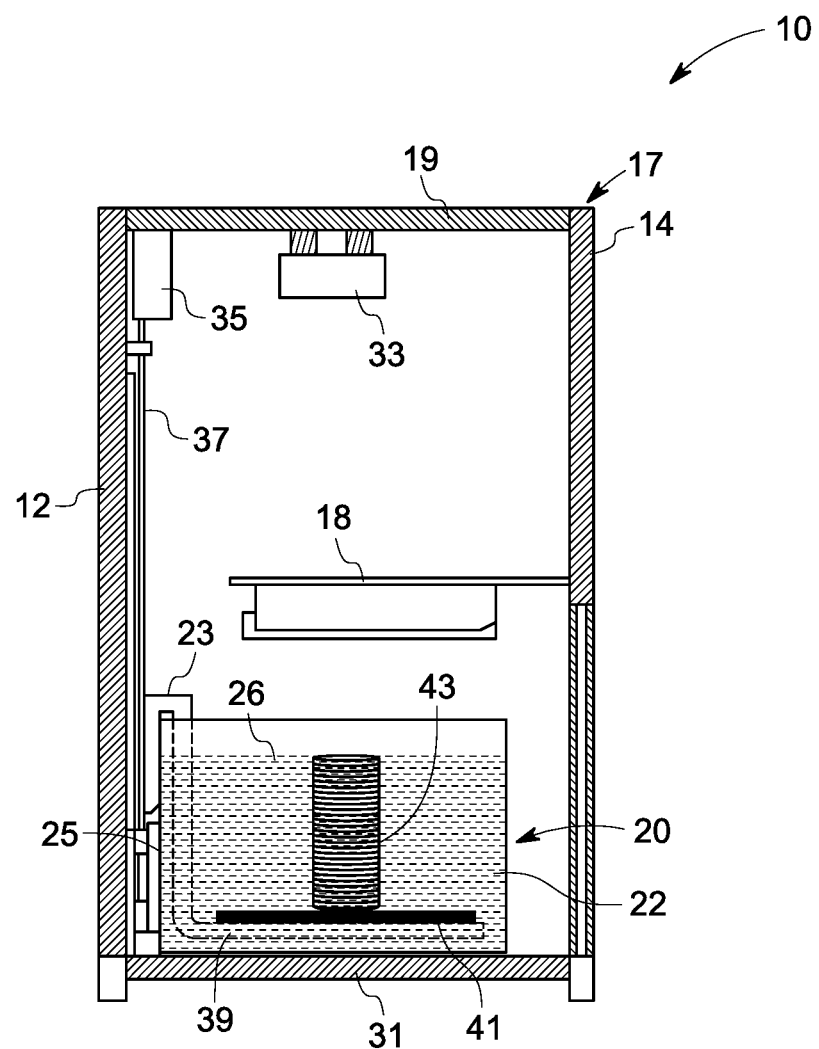
FIG. 3 is a side view of a rapid prototyping and manufacturing machine and a container, in accordance with embodiments of the present specification.

FIG. 3 illustrates a side view of a RP&M machine 10 and a container 20 in accordance with one embodiment of the present specification. In the illustrated embodiment, the container 20 is moved (e.g., rolled) inside the RP&M machine 10 via the plurality of rollers 27 (as shown in FIG. 2) such that the peripheral side 25 of the container 20 holding the bracket 23, is disposed proximate to the first side wall 12 of the housing 17. In such an embodiment, the bracket 23 may be coupled to a fork 39, which is disposed within the material 22, and to the elevator rod 37, which is coupled to the motor 35. The fork 39 may be configured to hold a support platform 41, where a plurality of layers of a component 43 is built during operation of the RP&M machine 10. The light emitting device 33 is configured to emit light beams on the material 22 for solidifying at least a portion of the material 22 while building each of the plurality of layers of the component 43. The re-coater assembly 18 is coupled to the second side wall 14 and configured to allow a re-coater blade (not shown in FIG. 3) to move longitudinally and/or laterally along the container 20, while supplying the material 22 to the container 20, spreading the material 22 uniformly along the container 20, or removing at least a portion of the material 22 from the container 20 after building each layer of the component 43. The re-coater assembly 18 is discussed in greater detail below. The support platform 41 disposed on the frame 39 is configured to be moved (e.g., raised and lowered) within the container 20 via the bracket 23 with respect to the working surface 26 of the material 20, after building each of the plurality of layers of the component 43.

FIG. 4 illustrates a perspective view of an optical measurement apparatus 16 and a re-coater assembly 18 in accordance with one embodiment of the present specification.

The optical measurement apparatus 16 includes a measurement arm 32, a plurality of energy devices 34, a mounting device 36, and a plurality of first aligning elements 38. The measurement arm 32 includes a first portion 40 rigidly coupled to the mounting device 36 and a second portion 42 movably disposed over the first portion 40. In the illustrated embodiment, the second portion 42 is an open-channel shaped component having a top wall 42a, a first side wall 42b, and a second side wall 42c. The first and second side walls 42b, 42c are coupled to each other via respective sides of top wall 42a. The plurality of first aligning elements 38, for example, a plurality of screws is disposed spaced apart from each other on the top wall 42a. The plurality of first aligning elements 38 may be configured to adjust the second portion 42 of the optical measurement apparatus 16 relative to at least one of a longitudinal direction 11, a lateral direction 13, or a radial direction 15 of the RP&M machine 10. Specifically, the plurality of first aligning elements 38 may be configured to align the optical measurement apparatus 16 in parallel with the surface 28 of the material 22 (as shown in FIG. 3) or a reference plane of the material 22. In one embodiment, the plurality of energy devices 34, for example, a plurality of laser devices is coupled to the first and second side walls 42b, 42c. In certain embodiments, at least one of the plurality of laser devices is a transceiver. In the illustrated embodiment, the plurality of energy devices 34 is positioned at a plurality of first locations along a length "$L_1$" of the second portion 42, along a same plane. More specifically, one of the plurality of energy devices 34 is positioned at a mid-section of the first side wall 42b and two of the plurality of energy devices 34 are positioned at mutually opposite end-sections of the second side wall 42c. In certain embodiments, each of the plurality of energy devices 34 is configured to transmit energy, for example, laser to a surface, receive reflected energy from the surface, and measure a radial distance between the measurement arm 32 and the surface. In one embodiment, the surface may be the surface 28 of the material 22 or a surface of each of the plurality of target elements (not shown in FIG. 4), which are discussed in detail below. Further, each of the plurality of energy devices 34 may include a display unit (not shown) configured to display the distance measured between the measurement arm 32 and the surface. In such embodiments, the plurality of first aligning elements 38 may be used to adjust or calibrate the optical measurement apparatus 16 based on the distance measured between the measurement atm 32 and the surface until the measured radial distances are equal.

In one example embodiment, the mounting device 36 has a magnetic base 32a including a knob 36b. In such example embodiments, the magnetic base 36a may be selectively moved to an engaged position from a disengaged position, to mount the mounting device 36 to the first side wall 12 (as shown in FIG. 3.) Thus, the optical measurement apparatus 16 may be detectably coupled to the first side wall 12 of the housing 17.

The re-coater assembly 18 includes a re-coater arm 52, a plurality of second aligning elements 54, a re-coater blade 56, and a plurality of target elements 58 (only one target element is shown in the embodiment of FIG. 4.) The re-coater assembly 18 may be movably coupled to the second side wall 14 (as shown in FIG. 3.) Specifically, a side wall 52a of the re-coater arm 52 may be coupled to the second side wall 14 to enable the re-coater assembly 18 to move along the longitudinal direction 11 and/or the lateral direction 13 during the process of building the component 43 (as shown in FIG. 3.) In one embodiment, the plurality of second aligning elements 54 is disposed spaced apart from each other and coupled to a top wall 52b of the re-coater arm 52. In certain embodiments, the re-coater blade 56 is a hollow rectangular component which may be coupled to one of a supply source or a vacuum source (not shown) and configured to supply and/or remove the portion of the material 22 from the container 20, while building each layer of the component 43. Other shapes of the re-coater blade 56 may be envisioned, without deviating from the scope of the present application. In one embodiment, the plurality of target elements 58, for example, a plurality of dowel pins is coupled to first and second peripheral surfaces 56b, 56c of the re-coater blade 56. In the illustrated embodiment, the first and second peripheral surfaces 56b, 56c are mutually opposite surfaces of the re-coater blade 56. The plurality of target elements 58 is positioned at a plurality of second locations along a length "$L_2$" of the re-coater blade 56, along a same plane. More specifically, one of the plurality of target elements 58 is positioned at a mid-section of the first peripheral surface 56b and two of the plurality of target elements 58 are positioned at mutually opposite end-sections of the second peripheral surface 56c.

In the illustrated embodiment of FIG. 4, the re-coater assembly 18, the optical measurement apparatus 16, and the material 22 are positioned such that the re-coater assembly 18 is between the optical measurement apparatus 16 and the material 18, and so the re-coater blade 56 is positioned proximate to the material 22. Further, the plurality of energy devices 34 is vertically aligned with the plurality of target elements 58. Specifically, each of the plurality of energy devices 34 is vertically aligned with a corresponding target element of the plurality of target elements 58.

In one embodiment, the plurality of second aligning elements 54 may be configured to align the re-coater blade 56 in parallel with the optical measurement apparatus 16. In one example embodiment, the plurality of second aligning elements 54 may adjust the re-coater blade 56 relative to at least one of the longitudinal direction 11, the lateral direction 13, and the radial direction 15. In one example embodiment, first and second aligning elements 54a, 54b may be used together to rotate the re-coater blade 56 relative to one of the longitudinal direction 11 or the lateral direction 13. Similarly, either of the first and second aligning elements 54a, 54b may be used to move i.e., raise or lower a leading edge 57a of the re-coater blade 56 along the radial direction 15. Similarly, the third aligning element 54c may be used to raise or lower a trailing edge 57b of the re-coater blade 56 along the radial direction 15.

In certain embodiments, at least three energy devices 34 as discussed herein, are used for i) determining the reference plane of the material, ii) determining a first reference plane of the optical measurement apparatus 16, iii) aligning the first reference plane with the reference plane of the material, iv) determining a second reference plane of the re-coater assembly 18, and v) aligning the second reference plane with the first reference plane.

Figure 5:
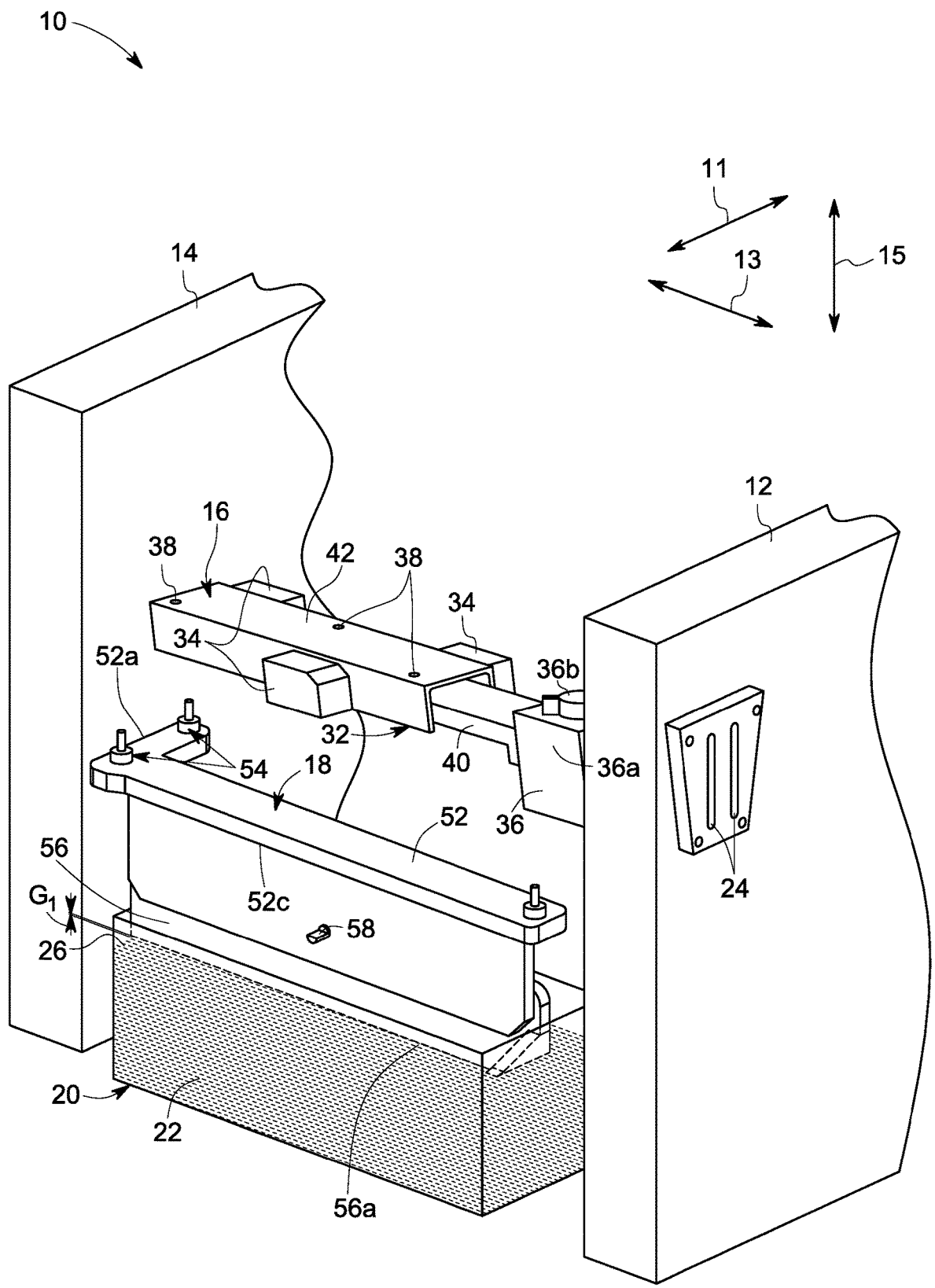
FIG. 5 is a perspective view of a portion of a rapid prototyping and manufacturing machine including an optical measurement apparatus, a re-coater blade, and a container, in accordance with embodiments of the present specification.

FIG. 5 illustrates a perspective view of a portion of a RP&M machine 10 in accordance with one embodiment of the present specification. In the illustrated embodiment of FIG. 5, the portion of the RP&M machine 10 includes a first side wall 12, a second side wall 14, an optical measurement apparatus 16, a re-coater assembly 18, and a container 20. The RP&M machine 10 may additionally include a bracket 23, a motor 35, an elevator rod 37, and a light emitting device 33, a frame 39, a support platform 41, and a component 43 (as shown in the FIGS. 1-4), which are not shown for ease of illustration and such an illustration should not be construed as a limitation of the present technique. In the illustrated embodiment, the container 20 is located or moved inside the RP&M machine 10. In a non-limiting embodiment of the present invention, the container 20 filled with the material 22 is moved inside the RP&M machine 10.

The optical measurement apparatus 16 is detectably coupled to the RP&M machine 10, for example, to the first side wall 12 of the RP&M machine 10. Specifically, the magnetic base 36a of the mounting device 36 is selectively moved to an engaged position from a disengaged position, to mount or clamp the mounting device 36 to the first side wall 12. Thus, the optical measurement apparatus 16 may be detectably coupled to the first side wall 12 of the RP&M machine 10. In one embodiment, the first side wall 12 includes a plurality of pre-defined templates 24 for providing the mounting bracket 36 to be detectably coupled to the first wall 12. It should be noted herein that only one pre-defined template 24 is shown in the embodiment of FIG. 5, for ease of illustration. In the embodiment of FIG. 5, the mounting bracket 36 and the pre-defined template 24 have a trapezoidal shape. In certain other embodiments, the shape of each of the mounting bracket 36 and the pre-defined template 24 may be complementary to one another. It should be noted herein that other shapes of the mounting bracket 36 and the pre-defined template 24 may be envisioned, without deviating from the scope of the present application. In some other embodiments, the plurality of pre-defined templates 24 may be a plurality of embossed features formed on the first side wall 12. In one or more embodiments, at least some of the plurality of pre-defined templates 24 is used for aligning the optical measurement apparatus 16 substantially parallel with the surface 28 of the material 22 or the reference plane of the material 22. Further, the plurality of first aligning elements 38 is used for further adjusting the second portion 42 of the measurement arm 32 relative to at least one of a longitudinal direction 11, a lateral direction 13, or a radial direction 15 of the RP&M machine 10. Specifically, the plurality of first aligning elements 38 is used to align the optical measurement apparatus 16 in parallel with the surface 28 of the material 22 or the reference plane of the material 22.

There-coater assembly 18 is movably coupled to the RP&M machine 10, for example, to the second side wall 14 RP&M machine 10. In certain embodiments, the first and second side walls 12, 14 are mutually opposite side walls of the RP&M machine 10. The re-coater assembly 18, the optical measurement apparatus 16, and the container 20 are positioned such that the re-coater assembly 18 is between the optical measurement apparatus 16 and the material 22. Specifically, the re-coater blade 56 is coupled to a bottom wall 52c of the re-coater arm 52 and positioned proximate to the material 22. Further, the plurality of second aligning elements 54 is used for adjusting the re-coater blade 56 to align the re-coater blade 56 in parallel with the optical measurement apparatus 16. Specifically, the plurality of second aligning elements 54 is used to adjust the re-coater blade 56 relative to at least one of the longitudinal direction 11, the lateral direction 13, or the radial direction 15 of the RP&M machine 10 to align the re-coater blade 56 in parallel with the optical measurement apparatus 16. In the illustrated embodiment, the re-coater blade 56 includes a bottom through-wall 56a positioned proximate to the material 22 such that a gap "$G_1$" is maintained between a surface 26 and the bottom through wall 56a. In other words, the re-coater blade 56 is located substantially away from the surface 26 of the material 22 relative to the radial direction 15 by an offset distance to define the gap "$G_1$" between the re-coater blade 56 and the material 22.

Figure 6:
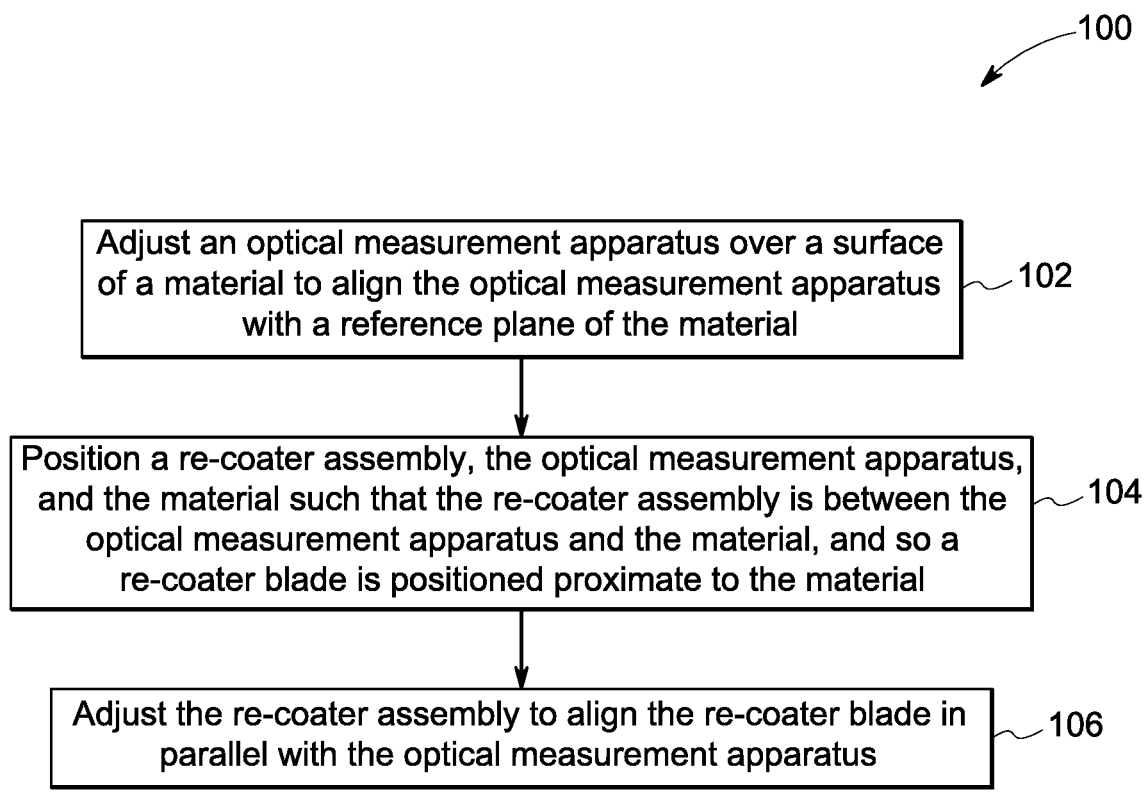
FIG. 6 a flow chart illustrating a method of aligning a re-coater assembly, in accordance with one embodiment of the present specification.

FIG. 6 is a flow chart illustrating a method 200 of aligning a re-coater assembly 18 (as shown in the embodiments of FIGS. 1-5) in accordance with one embodiment of the present specification. The method 100 includes a step 102 of adjusting an optical measurement apparatus 16 over a surface 26 of a material 22 to align the optical measurement apparatus 16 with a reference plane of the material 22. It should be noted herein the "reference plane" may also be referred to as a "horizontal plane." In one or more embodiments, the material 22 may be filled in the container 20 and defines the reference plane of the material 22. In such embodiments, the reference plane may be used for the alignment of the optical measurement apparatus 16 with the surface 26 of the material 22. In some embodiments, the step 102 of adjusting the optical measurement apparatus 16 includes detachably coupling the optical measurement apparatus 16 to a pre-defined template 24 located in a first side wall 12 of a RP&M machine 10. In one or more embodiments, at least some of the plurality of pre-defined templates 24 may allow the optical measurement apparatus 16 to be substantially aligned in parallel with the surface 28 of the material 22 or the reference plane of the material 22. Further, the step 102 of adjusting the optical measurement apparatus 16 includes a first sub-step i) of transmitting a plurality of first energy from a plurality of energy devices 34 to the surface 26 of the material 22. As discussed in the embodiment of FIGS. 1-5 the plurality of energy devices 34 may be positioned at a plurality of first locations along a length "$L_1$" of the optical measurement apparatus 16. Further, the step 102 of adjusting the optical measurement apparatus 16 includes a second sub-step of receiving a plurality of reflected first energy from the surface 26 of the material 22. The step 102 of adjusting the optical measurement apparatus 16 further includes a third sub-step of measuring a plurality of first radial distances between the surface 26 of the material 22 and the optical measurement apparatus 16 based on the plurality of reflected first energy to determine a first reference plane of the optical measurement apparatus 16. It should be noted herein the "first reference plane" may also be referred to as a "first horizontal plane." In one embodiment, at least one of the plurality of energy devices 34 may be a laser device. In certain embodiments, each of the plurality of energy devices may use known algorithm(s) to determine the first radial distance based on the plurality of reflected first energy. The step 102 of adjusting the optical measurement apparatus 16 further include a fourth sub-step of calibrating the optical measurement apparatus 16 until a plurality of measured first radial distances are equal, thereby aligning the first reference plane with the reference plane of the material 22. In some embodiments, a plurality of first aligning elements 38 is used to align the first reference plane of the optical measurement apparatus 16 with the reference plane of the material 22. In certain embodiments, the fourth sub-step of calibrating the optical measurement apparatus 16 may be optional step. In other words, usage of at least one of the plurality of pre-defined templates 24 for the adjusting of the optical measurement apparatus 16 may result in substantially aligning the optical measurement apparatus 16 to the surface 26 of the material 22.

The method 100 farther includes a step 104 of positioning a re-coater assembly 18, the optical measurement apparatus 16, and the material 22 such that the re-coater assembly 18 is between the optical measurement apparatus 16 and the material 22, and so a re-coater blade 56 of the re-coater assembly 18 is positioned proximate to the material 22. In one embodiment, the step 104 of positioning the re-coater assembly 18 includes vertically aligning the plurality of energy devices 34 with a plurality of target elements 58 of the re-coater assembly 18. As discussed in the embodiment of FIGS. 1-5, the plurality of target elements 58 may be positioned at a plurality of second locations along a length "$L_2$" of the re-coater assembly 18.

Further, the method 100 includes a step 106 of adjusting the re-coater assembly 18 to align the re-coater blade 56 in parallel with the optical measurement apparatus 16. In some embodiments, a plurality of second aligning elements 54 is used to adjust the re-coater assembly 18 in parallel with the optical measurement apparatus 16. In one embodiment, the step 106 of adjusting the re-coater assembly 18 includes coupling a re-coater arm 52 of the re-coater assembly 18 to a second side wall 14 of the RP&M machine 10, thereby allowing the re-coater blade 56 to move along one of the longitudinal direction 11 and/or the lateral direction 13 of the RP&M machine 10, during the process of building a component 43. In other words, the re-coater blade 56 is movably coupled to the second side wall 14 to allow the re-coater blade 56 to move longitudinally and/or laterally while supplying, spreading, or removing a portion of the material 22 from the container 20. The step 106 of adjusting the re-coater assembly 18 includes a first sub-step i) of transmitting a plurality of second energy from the plurality of energy devices 34 to the plurality of target elements 58. Further, the step 106 of adjusting the re-coater assembly 18 includes a second sub-step of receiving a plurality of reflected second energy from the surface 26 of the material 22. The step 106 of adjusting the re-coater assembly 18 further includes a third sub-step of measuring a plurality of second radial distances between the optical measurement apparatus 16 and the re-coater assembly 18 based on the plurality of reflected second energy to determine a second reference plane of the re-coater assembly 18. It should be noted herein the "second reference plane" may also be referred to as a "second horizontal plane." The step 106 of positioning the re-coater assembly 18 may further include a fourth sub-step of calibrating the re-coater assembly 18 until a plurality of measured second radial distances are equal, thereby aligning the second reference plane with the first reference plane. In some embodiments, a plurality of second aligning elements 54 is used to align the second reference plane of the re-coater assembly 18 with the first reference plane of the optical measurement apparatus 16. In one embodiment, the fourth sub-step of calibrating the re-coater assembly 18 includes at least one of moving one or both sides of the re-coater blade 56 relative to the radial direction 15 or rotating the re-coater blade 56 relative to one of the longitudinal direction 11 or the lateral direction 13 of the RP&M machine 10. Specifically, the fourth sub-step includes raising or lowering of a leading edge 57a or a trailing edge 57b of the re-coater blade 56 to align the second reference plane with the first reference plane.

In accordance to the embodiments discussed in the embodiments of FIGS. 1-6, the re-coater blade 56 is indirectly aligned to the reference plane of the material 22 by aligning the second reference plane of the re-coater assembly 18 with the first reference plane of the optical measurement apparatus 16. The method 100 further includes a step of moving the re-coater blade 56 away from the surface 26 of the material 22 along the radial direction 15 by an offset distance to define a gap "$G_1$" between the re-coater blade 56 and the material 22. In certain embodiments, the offset distance may be a function of thickness of each layer of the material 22 used to build a component 43. In some embodiments, the material 22 is one of a resin, a paste, or a powder.

Figure 7:
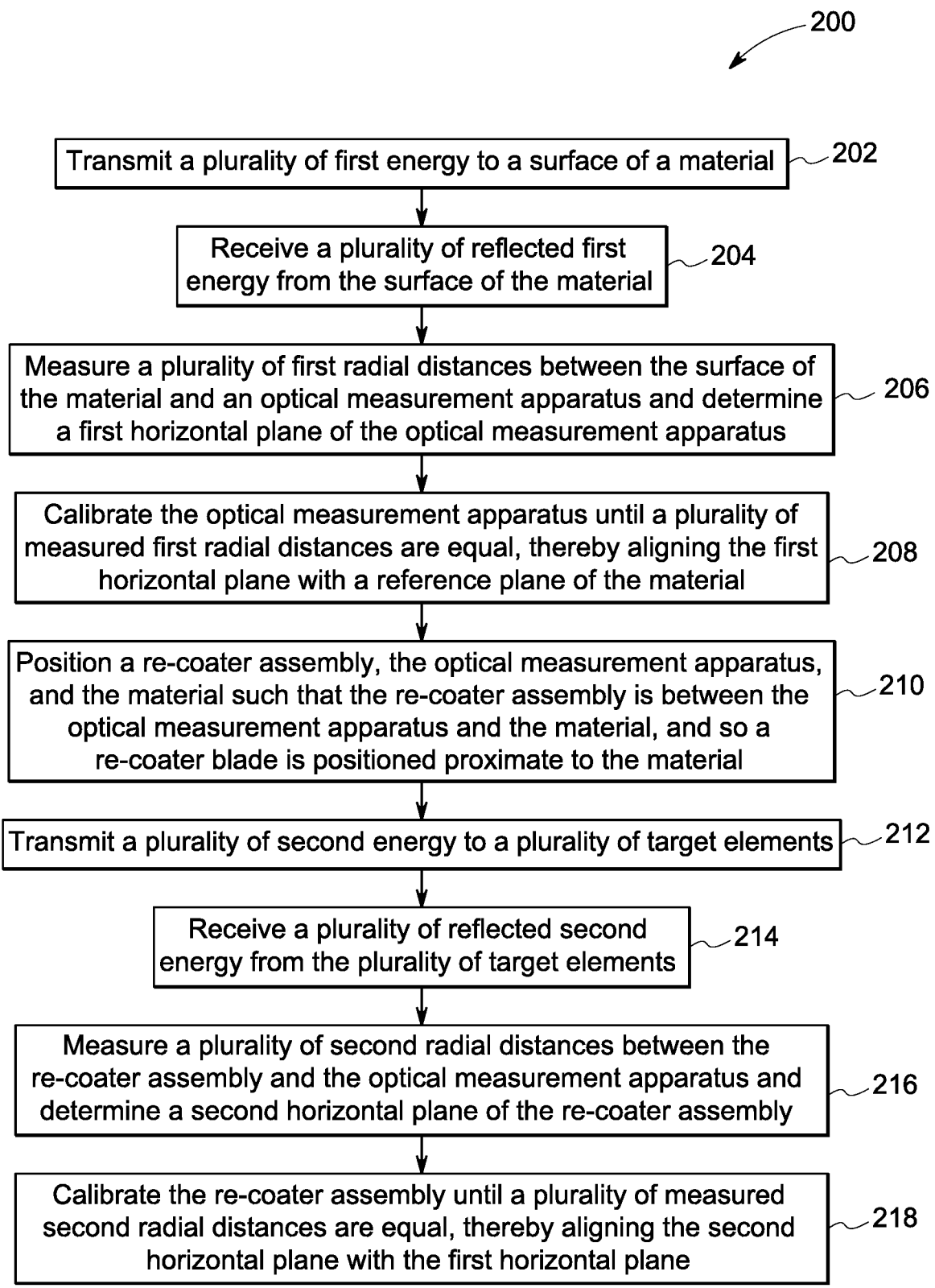
FIG. 7 a flow chart illustrating a method of aligning a re-coater assembly, in accordance with another embodiment of the present specification.

FIG. 7 a flow chart illustrating a method 200 of aligning a re-coater assembly (as shown in the embodiments of FIGS. 1-5) in accordance with another embodiment of the present specification. The method 200 includes a step 202 of transmitting a plurality of first energy from a plurality of energy devices 34 to a surface 26 of a material 22. In such embodiments, the plurality of energy devices 34 may be positioned at a plurality of first locations along a length "$L_1$" of an optical measurement apparatus 16. The method 200 further includes a step 204 of receiving a plurality of reflected first energy from the surface 26 of the material 22. Further, the method 200 includes a step 206 of measuring a plurality of first radial distances between the surface 26 of the material 22 and the optical measurement apparatus 16 based on the plurality of reflected first energy to determine a first reference plane of the optical measurement apparatus 16. The method 200 further includes a step 208 of calibrating the optical measurement apparatus 16 until a plurality of measured first radial distances are equal, thereby aligning the first reference plane with a reference plane of the material 22. In some embodiments, a plurality of first aligning elements 38 of the optical measurement apparatus 16 is used to align the first reference plane of the optical measurement apparatus 16 with the reference plane of the material 22. Specifically, the optical measurement apparatus 16 may be calibrated by moving the optical measurement apparatus 16 via the plurality of first aligning elements 38. In some other embodiments, the optical measurement apparatus 16 may be detachably coupled to a pre-defined template 24 of a RP&M machine 10 to align the first reference plane of the optical measurement apparatus 16 with the reference plane of the material 22. Specifically, the optical measurement apparatus 16 may be calibrated by detachably coupling the optical measurement apparatus 16 to the pre-defined template 24 of the RP&M machine 10. The method 200 further includes a step 210 of positioning a re-coater assembly 18, the optical measurement apparatus 16, and the material 22 such that the re-coater assembly 18 is between the optical measurement apparatus 16 and the material 22, and so a re-coater blade 56 of the re-coater assembly 18 is positioned proximate to the material 22. Specifically, the step 210 of positioning the re-coater assembly 18, the optical measurement apparatus 16, and the material 22 includes vertically aligning the plurality of energy devices 34 with a plurality of target elements of the re-coater assembly 18. In one embodiment, a re-coater arm 52 of the re-coater assembly 18 is movably coupled to a second side wall 12 of the RP&M machine 10, thereby allowing the re-coater blade 56 to move relative to one of a longitudinal direction 11 or a lateral direction 13, during a process of building a component 43. The method 200 further includes a step 212 of transmitting a plurality of second energy from the plurality of energy devices 34 to the plurality of target elements 58 of the re-coater assembly 18. In such embodiments, the plurality of target elements 58 is positioned at a plurality of second locations along a length "$L_2$" of the re-coater assembly 18. Further, the method 200 includes a step 214 of receiving a plurality of reflected second energy from the plurality of target elements 58. The method 200 further includes a step 216 of measuring a plurality of second radial distances between the re-coater assembly 18 and the optical measurement apparatus 16 based on the plurality of second reflected energy to determine a second reference plane of the re-coater assembly 18. The method 200 further includes a step 218 of calibrating the re-coater assembly 18 until a plurality of measured second radial distances are equal, thereby aligning the second reference plane with the first reference plane. In some embodiments, a plurality of second aligning elements 54 of the re-coater assembly 18 is used to align the second reference plane of the re-coater blade 56 with the first reference plane of the optical measurement apparatus 16. Specifically, the step 218 of calibrating the re-coater assembly 18 includes at least one of moving (e.g., raising or lowering) one or both sides of the re-coater blade 56 relative to a radial direction 15 or rotating the re-coater blade 56 relative to one of the longitudinal direction 11 and the lateral direction 13 via the plurality of second aligning elements 54.

The method 200 further includes a step of moving the re-coater blade 56 away from the surface 26 of the material 22 along the radial direction 15 by an offset distance to define a gap "$G_1$" between the re-coater blade 56 and the material 22. In certain embodiments, the offset distance may be a function of thickness of each layer of the material 22 used to build the component 43. In some embodiments, the material 22 is one of a resin, a paste, or a powder.

In accordance with certain embodiments discussed herein, the exemplary optical measurement apparatus may be configured to accurately and quickly align the re-coater blade to the surface of the material, thus may result in decreased down-time of the RP&M machine. The exemplary optical measurement apparatus may be detachably coupled to the RP&M machine, thus upon alignment of the re-coater blade, the optical measurement apparatus may be detached from the RP&M machine and employed for re-coater blade alignment in another RP&M machine. Thus, the present optical measurement apparatus and process may easily handle undesirably a large gauge repeatability and reproducibility (R&R.)

While only certain features of embodiments have been illustrated and described herein, many modifications and changes will occur to those skilled in the art. It is, therefore, to be understood that the appended embodiments are intended to cover all such modifications and changes as falling within the scope of the disclosed technique.

The invention claimed is:

1. A method comprising:
  adjusting an optical measurement apparatus over a surface of a material to align the optical measurement apparatus with a reference plane of the material;
  positioning a re-coater assembly, the optical measurement apparatus, and the material such that the re-coater assembly is between the optical measurement apparatus and the material, and so a re-coater blade of the re-coater assembly is positioned proximate to the material; and
  adjusting the re-coater assembly to align the re-coater blade in parallel with the optical measurement apparatus.

2. The method of claim 1, wherein adjusting the optical measurement apparatus further comprises detachably coupling the optical measurement apparatus to a rapid prototyping and manufacturing machine.

3. The method of claim 2, further comprising movably coupling the re-coater assembly to the rapid prototyping and manufacturing machine for moving the re-coater blade relative to one of a longitudinal direction or a lateral direction.

4. The method of claim 1, wherein adjusting the optical measurement apparatus comprises:
  transmitting a plurality of first energy from a plurality of energy devices to the surface of the material, wherein the plurality of energy devices is positioned at a plurality of first locations along a length of the optical measurement apparatus;
  receiving a plurality of reflected first energy from the surface of the material;
  measuring a plurality of first radial distances between the surface of the material and the optical measurement apparatus based on the plurality of reflected first energy to determine a first reference plane of the optical measurement apparatus; and
  calibrating the optical measurement apparatus via a plurality of first aligning elements of the optical measurement apparatus until a plurality of measured first radial distances are equal, thereby aligning the first reference plane with the reference plane of the material.

5. The method of claim 4, wherein positioning the re-coater assembly, the optical measurement apparatus, and the material comprises vertically aligning the plurality of energy devices with a plurality of target elements of the re-coater assembly, wherein the plurality of target elements is positioned at a plurality of second locations along a length of the re-coater assembly.

6. The method of claim 5, wherein adjusting the re-coater assembly comprises:

transmitting a plurality of second energy from the plurality of energy devices to the plurality of target elements;
receiving a plurality of reflected second energy from the plurality of target elements;
measuring a plurality of second radial distances between the optical measurement apparatus and the re-coater assembly based on the plurality of reflected second energy to determine a second reference plane of the re-coater assembly; and
calibrating the re-coater assembly via a plurality of second aligning elements until a plurality of measured second radial distances are equal, thereby aligning the second reference plane with the first reference plane.

7. The method of claim 6, wherein calibrating the re-coater assembly comprises at least one of:
moving one or both sides of the re-coater blade relative to a radial direction; and
rotating the re-coater blade relative to one of a longitudinal direction or a lateral direction.

8. The method of claim 1, further comprising moving the re-coater blade away from the surface of the material relative to a radial direction by an offset distance to define a gap between the re-coater blade and the material.

* * * * *